United States Patent
Kaai et al.

(10) Patent No.: US 12,308,435 B2
(45) Date of Patent: May 20, 2025

(54) BINDER FOR A SECONDARY BATTERY ELECTRODE AND USE THEREOF

(71) Applicant: TOAGOSEI CO. LTD., Tokyo (JP)

(72) Inventors: Michihiro Kaai, Nagoya (JP); Naohiko Saito, Nagoya (JP); Toshifumi Kondo, Nagoya (JP)

(73) Assignee: TOAGOSEI CO. LTD., Tokyo (JP)

( * ) Notice: Subject to any disclaimer, the term of this patent is extended or adjusted under 35 U.S.C. 154(b) by 717 days.

(21) Appl. No.: 17/416,888

(22) PCT Filed: Dec. 10, 2019

(86) PCT No.: PCT/JP2019/048274
§ 371 (c)(1),
(2) Date: Jun. 21, 2021

(87) PCT Pub. No.: WO2020/129750
PCT Pub. Date: Jun. 25, 2020

(65) Prior Publication Data
US 2022/0059845 A1   Feb. 24, 2022

(30) Foreign Application Priority Data
Dec. 18, 2018 (JP) ................ 2018-235950

(51) Int. Cl.
*H01M 4/62* (2006.01)
*C08F 293/00* (2006.01)
*H01M 10/052* (2010.01)

(52) U.S. Cl.
CPC ......... *H01M 4/622* (2013.01); *C08F 293/005* (2013.01); *H01M 10/052* (2013.01); *C08F 2438/03* (2013.01)

(58) Field of Classification Search
CPC .................................................. H01M 4/622
See application file for complete search history.

(56) References Cited

U.S. PATENT DOCUMENTS

| | | |
|---|---|---|
| 2007/0021569 A1 | 1/2007 | Willis et al. |
| 2010/0203785 A1 | 8/2010 | Willis et al. |
| 2014/0045054 A1 | 2/2014 | Komaba et al. |
| 2015/0287993 A1 | 10/2015 | Komaba et al. |
| 2016/0053125 A1 | 2/2016 | Shimanaka et al. |
| 2017/0040612 A1 | 2/2017 | Komaba et al. |
| 2018/0138508 A1 | 5/2018 | Komaba et al. |
| 2020/0048499 A1 | 2/2020 | Andou et al. |
| 2021/0111408 A1* | 4/2021 | Matsuo ................ C08L 33/064 |

FOREIGN PATENT DOCUMENTS

| | | | | |
|---|---|---|---|---|
| CN | 101228193 A | | 7/2008 | |
| CN | 105143342 A | | 12/2015 | |
| CN | 108417836 A | * | 8/2018 | .......... C08F 293/005 |
| JP | 2001-233678 A | | 8/2001 | |
| JP | 2010-215712 A | | 9/2010 | |
| JP | 2012-204303 A | | 10/2012 | |
| JP | 2012-256541 A | | 12/2012 | |
| WO | 2012/133034 A1 | | 10/2012 | |
| WO | 2014/065407 A1 | | 5/2014 | |
| WO | 2015/163302 A1 | | 10/2015 | |
| WO | 2015/163321 A1 | | 10/2015 | |
| WO | 2018/199269 A1 | | 11/2018 | |

OTHER PUBLICATIONS

Mar. 7, 2023 Office Action issued in Chinese Patent Application No. 201980083924.3.
Nov. 7, 2023 Office Action issued in Japanese Application No. 2020-561332.
Aug. 22, 2023 Office Action Issued in Chinese Patent Application No. 201980083924.3.
Mar. 10, 2020 Search Report issued in International Patent Application No. PCT/JP2019/048274.
Mar. 10, 2020 Written Opinion of the International Searching Authority issued in International Patent Application No. PCT/JP2019/048274.
Feb. 24, 2024 Office Action issued in Chinese Patent Application No. 201980083924.3.
Jan. 22, 2025 Office Action issued in Korean Patent Application No. 10-2021-7021898.

* cited by examiner

*Primary Examiner* — Jonathan G Jelsma

(57) ABSTRACT

A binder for secondary battery electrodes, which enables the achievement of a secondary battery electrode that has higher binding properties than ever before contains a block polymer that has a polymer block (A) and a polymer block (B), and it is configured such that: the polymer block (A) includes less than 30% by mass of a structural unit derived from (meth)acrylic acid to a total structural units of the polymer block (A); and the polymer block (B) includes 30 mass % or more and 100 mass % or less of a structural unit derived from (meth)acrylic acid to a total structural units of the polymer block (B).

13 Claims, No Drawings

BINDER FOR A SECONDARY BATTERY ELECTRODE AND USE THEREOF

TECHNICAL FIELD

The present teaching relates to a binder for a secondary battery electrode and use thereof.

BACKGROUND ART

Power storage devices such as nickel-hydride secondary batteries, lithium ion secondary batteries and electric double-layer capacitors are in practical use as secondary batteries. To prepare the electrodes used in these secondary batteries, a composition containing an active material, a binder and other materials for forming an electrode mixture layer is coated, dried or the like on a collector. In the case of lithium ion secondary batteries for example, aqueous binders containing styrene-butadiene rubber (SBR) latex and carboxymethyl cellulose (CMC) are being used as binders in compositions for negative electrode mixture layers. Binders containing aqueous solutions or aqueous dispersions of acrylic polymers are also known as binders with excellent dispersibility and binding ability. On the other hand, N-methyl-2-pyrrolidone (NMP) solutions of polyvinylidene fluoride (PVDF) are widely used as binders in positive electrode mixture layers.

As the uses of various secondary batteries continue to expand, meanwhile, demands for increased energy density, reliability and durability are tending to increase. For example, specifications using silicon active materials as negative electrode active materials are in increased use as a means of increasing the capacitance of lithium ion secondary batteries. However, silicon active materials are known to undergo large volume changes during charging and discharging, causing peeling, detachment and the like of the electrode mixture layer during repeated use, and resulting in problems such as reduced battery capacitance and deterioration of the cycle characteristics (durability). In general, an effective way of controlling these problems is to increase the binding ability of the binder, and research is being done into increasing the binding ability of the binder with the aim of improving durability.

Binders using the above acrylic polymers have been proposed as binders exhibiting favorable binding ability and durability-improving effects.

According to Patent Literature 1, a battery that does not suffer breakdown of the electrode structure, even when using an active material containing silicon, can be provided by using as a binder a polymer obtained by crosslinking a polyacrylic acid with a specific crosslinking agent. The binder for a lithium battery described in Patent Literature 2 includes a polymer that is crosslinked with a specific crosslinking agent and contains a monomer unit derived from acrylic acid as a constituent, and this exhibits a high capacity retention rate even after repeated charge/discharge.

Meanwhile, in a similar manner, with an aim of improving performance, e.g., binding ability, a binder containing a block copolymer having segments containing a structural unit of a vinyl monomer having an acid component and segments containing a structural unit of a (meth)acrylic acid alkyl ester monomer is disclosed in Patent Literature 3, which investigates binders using block copolymers.

CITATION LIST

Patent Literature

Patent Literature 1: WO 2014/065407
Patent Literature 2: WO 2015/163302
Patent Literature 3: Japanese Patent Application Publication No. 2012-204303

SUMMARY

Technical Problem

Although the binders disclosed in Patent Literature 1 to 3 may all contribute to favorable binding ability, electrodes with even greater binding ability are in demand as the performance of secondary batteries continues to improve.

In light of these circumstances, the present teaching provides a binder for a secondary battery electrode capable of yielding a secondary battery electrode having greater binding ability than that in the prior art. The present teaching also provides a secondary battery electrode composition and a secondary battery electrode containing this binder.

Solution to Technical Problem

The inventors have found, as a result of diligent research aimed at solving the above problems, that the binding ability of an electrode mixture layer could be increased by using a binder containing a block copolymer having a block with a small amount of structural units derived from (meth)acrylic acid and a block containing a specific amount of such structural units. The present disclosures provide the following means based on these findings.

The present teaching is as follows. [1] A binder for a secondary battery electrode, comprising a block polymer having a polymer block (A) and a polymer block (B), wherein
   in the polymer block (A), structural units derived from (meth)acrylic acid constitute less than 30 mass % of a total structural units of the polymer block (A), and
   in the polymer block (B), structural units derived from (meth)acrylic acid constitute 30 mass % or more and 100 mass % or less of a total structural units of the polymer block (B).

[2] The binder for a secondary battery electrode according to [1], wherein a ratio of the polymer block (A) in the block polymer is 0.1 mass % or more and 80 mass % or less, and a ratio of the polymer block (B) in the block polymer is 20 mass % or more and 99.9 mass % or less.

[3] The binder for a secondary battery electrode according to [1] or [2], wherein the polymer block (A) has a glass transition temperature (Tg) of at least −30° C.

[4] The binder for a secondary battery electrode according to any one of [1] to [3], wherein the block polymer is a salt in which at least 80 mol % of carboxyl groups of the block polymer are neutralized.

[5] The binder for a secondary battery electrode according to any one of [1] to [4], wherein the polymer block (B) is a polymer block obtained by polymerizing a monomer composition containing (meth)acrylic acid and a crosslinkable monomer.

[6] A secondary battery electrode mixture layer composition comprising the binder for a secondary battery electrode according to any one of [1] to [5] together with an active material and water.

[7] A secondary battery electrode provided with an electrode mixture layer containing the binder for a secondary battery electrode according to any one of [1] to [5] on a surface of a collector.

[8] A method for manufacturing a block polymer for use in a binder for a secondary battery electrode, with the block polymer having a polymer block (A) and a polymer block (B), the method comprises:
polymerizing monomer components with a (meth)acrylic acid content of less than 30 mass % by a living radical polymerization method to manufacture the polymer block (A); and
polymerizing monomer components with a (meth)acrylic acid content of 30 mass % or more and 100 mass % or less in the presence of the polymer block (A) to manufacture the polymer block (B).

[9] The method of manufacturing a block polymer according to [8], wherein the living radical polymerization method is a reversible addition-fragmentation chain-transfer polymerization (RAFT) method.

Advantageous Effects

The binder for a secondary battery electrode of the present teaching exhibits excellent binding ability to electrode active materials and the like. Moreover, this binder can exhibit good adhesiveness to the collector. Therefore, an electrode mixture layer containing the binder and an electrode provided therewith can have excellent binding ability while maintaining its integrity.

DESCRIPTION OF EMBODIMENTS

The binder for a secondary battery electrode of the present teaching contains a block polymer and may mixed with an active material and water to obtain a secondary battery electrode mixture layer composition (hereinafter also called "the composition"). This composition may be a slurry that can be coated on the collector, or it may be prepared as a wet powder and pressed onto the collector surface. The secondary battery electrode of the present teaching is obtained by forming a mixture layer from this composition on the surface of a copper foil, aluminum foil or other collector.

Hereinafter, each of the binder for the secondary battery electrode of the present teaching, the composition for the mixture layer of the secondary battery electrode obtained by using the binder, the secondary battery electrode, and the secondary battery will be described in detail.

In the present specification, "(meth) acrylic" means acrylic and/or methacrylic, and "(meth)acrylate" means acrylate and/or methacrylate. Further, the "(meth) acryloyl group" means an acryloyl group and/or a methacryloyl group.

1. Binder

The binder for a secondary battery electrode of the present teaching contains a block polymer (hereinafter also called "the block polymer"). The block polymer has a polymer block (A) in which structural units derived from (meth) acrylic acid constitute less than 30 mass % and a polymer block (B) in which structural units derived from (meth) acrylic acid constitute from 30 mass % to 100 mass %. This block polymer is described in detail below.

<Polymer Block (A)>

The polymer block (A) is a polymer block in which structural units derived from (meth)acrylic acid constitute less than 30 mass % and can be obtained for example by polymerizing a monomer composition in which the content of (meth)acrylic acid is less than 30 mass %. The content of (meth)acrylic acid in this monomer composition may also be not more than 20 mass %, or not more than 10 mass %, or 0 mass %.

The polymer block (A) is not particularly limited as long as it has structural units derived from (meth)acrylic acid constitute less than 30 mass %. The structural units derived from monomers other than (meth)acrylic acid (hereinafter also called "component (a)") are also not particularly limited. Examples of the component (a) include ethylenically unsaturated carboxylic acid monomers other than (meth) acrylic acid, aromatic vinyl monomers, maleimide compounds, (meth)acrylic acid ester monomers, (meth)acrylamide and its derivatives, nitrile group-containing ethylenically unsaturated monomers.

The amount of each of these monomers may be for example at least 10 mass %, or at least 30 mass %, or at least 50 mass %, or at least 70 mass % of the total amount of all the monomers constituting the polymer block (A). The upper limit may be not more than 100 mass %, or not more than 90 mass %, or not more than 80 mass %. The total amount of the component (a) relative to all constituent monomers of the polymer block (A) may be more than 70 mass %, or at least 80 mass %, or at least 90 mass %, or 100 mass %.

Examples of ethylenically unsaturated carboxylic acid monomers other than (meth)acrylic acid include ethylenically unsaturated dicarboxylic acids such as itaconic acid, maleic acid and citraconic acid, and their acid anhydrides; (meth)acrylamide alkyl carboxylic acids such as (meth) acrylamide hexanoic acid and (meth)acrylamide dodecanoic acid; and ethylenically unsaturated monocarboxylic acids such as crotonic acid, succinic acid monohydroxyethyl (meth)acrylate, ω-carboxy-caprolactone mono(meth)acrylate and β-carboxyethyl (meth)acrylate, and one of these alone or a combination of two or more may be used. The ethylenically unsaturated carboxylic acid monomer may be in the form of a wholly or partially neutralized salt.

Examples of aromatic vinyl monomers include styrene, α-methylstyrene, vinyl naphthalene and isopropenyl naphthalene, and one of these alone or a combination of two or more may be used.

Examples of maleimide compounds include maleimide and N-substituted maleimide compounds. Examples of N-substituted maleimide compounds include N-alkyl substituted maleimide compounds such as N-methyl maleimide, N-ethyl maleimide, N-n-propyl maleimide, N-isopropyl maleimide, N-n-butyl maleimide, N-isobutyl maleimide, N-tert-butyl maleimide, N-pentyl maleimide, N-hexyl maleimide, N-heptyl maleimide, N-octyl maleimide, N-lauryl maleimide and N-stearyl maleimide; N-cycloalkyl substituted maleimide compounds such as N-cyclopentyl maleimide and N-cyclohexyl maleimide; and N-aryl substituted maleimide compounds such as N-phenyl maleimide, N-(4-hydroxyphenyl) maleimide, N-(4-acetylphenyl) maleimide, N-(4-methoxyphenyl) maleimide, N-(4-ethoxyphenyl) maleimide, N-(4-chlorophenyl) maleimide, N-(4-bromophenyl) maleimide and N-benzyl maleimide, and one or two or more of these may be used.

Examples of (meth)acrylic acid ester monomers include (meth)acrylic acid alkyl ester compounds such as methyl (meth)acrylate, ethyl (meth)acrylate, butyl (meth)acrylate, isobutyl (meth)acrylate and 2-ethylhexyl (meth)acrylate; aromatic (meth)acrylic acid ester compounds such as phenyl (meth)acrylate, phenylmethyl (meth)acrylate, phenylethyl (meth)acrylate and phenoxyethyl (meth)acrylate; (meth) acrylic acid alkoxyalkyl ester compounds such as 2-methoxyethyl (meth)acrylate and ethoxyethyl (meth)acrylate; and (meth)acrylic acid hydroxyalkyl ester compounds such as hydroxyethyl (meth)acrylate, hydroxypropyl (meth) acrylate and hydroxybutyl (meth)acrylate, and one of these alone or a combination of two or more may be used. From the standpoint of the cycle characteristics and adhesiveness with the active material, an aromatic (meth)acrylic acid ester compound can be used by preference.

Examples of (meth)acrylamide derivatives include N-alkyl (meth)acrylamide compounds such as isopropyl (meth)acrylamide, t-butyl (meth)acrylamide; N-alkoxy alkyl (meth)acrylamide compounds such as N-n-butoxymethyl (meth)acrylamide and N-isobutoxymethyl (meth)acrylamide; and N,N-dialkyl (meth)acrylamide compounds such as dimethyl (meth)acrylamide and diethyl (meth)acrylamide, and one of these or a combination of two or more may be used.

Examples of nitrile group-containing ethylenically unsaturated monomers include (meth)acrylonitrile, (meth)acrylic acid cyanoalkyl ester compounds such as cyanomethyl (meth)acrylate and cyanoethyl (meth)acrylate, cyano group-containing unsaturated aromatic compounds such as 4-cyanostyrene and 4-cyano-α-methylstyrene, and vinylidene cyanide, and one of these alone or a combination of two or more may be used. Among these, acrylonitrile is desirable because of its high nitrile group content.

To obtain good binding ability, the glass transition temperature (Tg) of the polymer block (A) is preferably at least −30° C. The Tg may also be at least −20° C., or at least 0° C., or at least 20° C., or at least 50° C., or at least 80° C. The upper limit of the Tg is 350° C. due to restrictions on the types of constituent monomer units that can be used. The Tg may also be for example not more than 300° C., or not more than 280° C., or not more than 250° C.

In this Description, the Tg of the polymer block (A) can be obtained by differential scanning calorimetry (DSC). When DSC measurement is impossible, it can be calculated by a FOX formula from the Tg values of homopolymers of the individual monomers constituting the polymer block. The same applies to the other polymer blocks including the polymer block (B) described below.

The number-average molecular weight (Mn) of the polymer block (A) is not particularly limited but is preferably in the range of from 1,000 to 1,000,000. If it has a number-average molecular weight of at least 1,000, it can be adsorbed onto the active material and other electrode materials and contribute to improving the binding ability of the electrode. On the other hand, a molecular weight of not more than 1,000,000 is desirable for ensuring good flowability and for ease of handling during manufacturing and the like. The number-average molecular weight of the block polymer (A) is preferably at least 5,000, or more preferably at least 8,000, or still more preferably at least 10,000. The upper limit is preferably not more than 500,000, or more preferably not more than 300,000, or still more preferably not more than 100,000.

The molecular weight distribution (Mw/Mn) obtained by dividing the weight-average molecular weight (Mw) by the above number-average molecular weight (Mn) of the polymer block (A) is preferably not more than 3.0 from the standpoint of binding ability. More preferably it is not more than 2.5, or still more preferably not more than 2.0, or yet more preferably not more than 1.5, or most preferably not more than 1.3. The lower limit of the molecular weight distribution (Mw/Mn) is normally 1.0.

The polymer block (A) is a relatively hydrophobic segment, and when this block polymer is used as a binder, it tends to be easily adsorbed on the surface of carbon active material and other active materials. It is thus possible to achieve strong binding between active materials, resulting in a secondary battery electrode with excellent binding ability.

<Polymer Block (B)>

The polymer block (B) is a polymer block in which structural units derived from (meth)acrylic acid constitute 30 mass % or more and 100 mass % or less and can be obtained for example by polymerizing a monomer composition with a (meth)acrylic acid content of 30 mass % or more and 100 mass % or less. Excellent adhesiveness on the collector can be ensured if the content of structural units derived from (meth)acrylic acid is within this range. To improve the dispersion stability of the composition and obtain greater binding force, the minimum percentage of structural units derived from (meth)acrylic acid is preferably at least 50 mass %. The minimum may also be at least 60 mass %, or at least 70 mass %, or at least 80 mass %. The maximum is for example not more than 99.9 mass %, or for example not more than 99.5 mass %, or for example not more than 99 mass %, or for example not more than 98 mass %, or for example not more than 95 mass %, or for example not more than 90 mass %, or for example not more than 80 mass %. The range can be set by appropriately combining these minimum and maximum values and may be for example 50 mass % or more and 100 mass % or less, or 50 mass % or more and 99.9 mass % or less, or 50 mass % or more and 99 mass % or less, or 70 mass % or more and 99 mass % or less, or 80 mass % or more and 99 mass % or less.

In addition to (meth)acrylic acid, the monomers constituting the polymer block (B) may include other non-crosslinkable ethylenically unsaturated monomers (hereinafter also called "component (b)") that are copolymerizable therewith. Monomers similar to those described above as component (a) of the polymer block (A) may be used as the component (b), and one of these alone or a combination of two or more may be used.

The ratio of the component (b) may be 0 mass % or more and 70 mass % or less of the total amount of all non-crosslinkable monomers constituting the polymer block (B). The ratio of the component (b) may also be 1 mass % or more and 50 mass % or less, or 5 mass % or more and 50 mass % or less, or 10 mass % or more and 50 mass % or less, or 20 mass % or more and 40 mass % or less. When the component (b) is included in the amount of at least 1 mass % of the total amount of the non-crosslinkable monomers, an improvement effect on lithium ion conductivity can be expected because compatibility with the electrolyte solution is improved.

Among the components (b), a (meth)acrylic acid hydroxyalkyl ester compound such as hydroxyethyl (meth)acrylate, hydroxypropyl (meth)acrylate or hydroxybutyl (meth)acrylate is preferred. Hydroxyl groups are introduced into the polymer block (B) by using such a hydroxyl group-containing monomer as the component (b). This is desirable for conferring excellent binding ability on a binder containing the resulting block copolymer.

To further improve the lithium-ion conductivity and high-rate characteristics, compounds having either bonds including (meth)acrylic acid alkoxy alkyl esters such as 2-methoxyethyl (meth)acrylate and 2-ethoxyethyl (meth)acrylate are desirable, and 2-methoxyethyl (meth)acrylate is especially desirable.

A compound having acryloyl groups is desirable as the component (b) because the high polymerization speed produces a polymer with a long primary chain length, resulting in a binder with good binding ability. For obtaining good flex resistance of the resulting electrode, a compound having a glass transition temperature (Tg) of not more than 0° C. of the homopolymer is desirable as a nonionic ethylenically unsaturated monomer.

The monomers constituting the polymer block (B) may also include a crosslinkable monomer. Examples of crosslinkable monomers in this Description include polyfunctional polymerizable monomers having two or more polymerizable unsaturated groups, and monomers having self-crosslinking crosslinkable functional groups such as hydrolyzable silyl groups.

The polyfunctional polymerizable monomers are compounds having two or more polymerizable functional groups such as (meth)acryloyl or alkenyl groups in the molecule, and examples include polyfunctional (meth)acrylate compounds, polyfunctional alkenyl compounds, and compounds having both (meth)acryloyl and alkenyl groups. One of these compounds may be used alone, or a combination of two or more may be used. Among these, a polyfunctional alkenyl compound is preferred for obtaining a uniform crosslinked structure, and a polyfunctional allyl ether compound having two or more allyl ether groups in the molecule is especially preferred.

Examples of polyfunctional (meth)acrylate compounds include di(meth)acrylates of dihydric alcohols, such as ethylene glycol di(meth)acrylate, propylene glycol di(meth) acrylate, 1.6-hexanediol di(meth)acrylate, polyethylene glycol di(meth)acrylate and polypropylene glycol di(meth) acrylate; tri(meth)acrylates of trihydric and higher polyhydric alcohols, such as trimethylolpropane tri(meth) acrylate, trimethylolpropane ethylene oxide modified tri (meth)acrylate, glycerin tri(meth)acrylate, pentaerythritol tri(meth)acrylate and pentaerythritol tetra(meth)acrylate; poly(meth)acrylates such as tetra(meth)acrylate and bis-amides such as methylene bisacrylamide and hydroxyethylene bisacrylamide.

Examples of polyfunctional alkenyl compounds include polyfunctional allyl ether compounds such as trimethylolpropane diallyl ether, trimethylolpropane triallyl ether, pentaerythritol diallyl ether, pentaerythritol triallyl ether, tetraallyl oxyethane and polyallyl saccharose; polyfunctional allyl compounds such as diallyl phthalate; and polyfunctional vinyl compounds such as divinyl benzene.

Examples of compounds having both (meth)acryloyl and alkenyl groups include allyl (meth)acrylate, isopropenyl (meth)acrylate, butenyl (meth)acrylate, pentenyl (meth) acrylate and 2-(2-vinyloxyethoxy)ethyl (meth)acrylate.

Specific examples of the monomers having self-crosslinkable functional groups include vinyl monomers containing hydrolysable silyl groups, and N-methylol (meth)acrylamide, N-methoxyalkyl (meth)acrylate. One of these compounds or a mixture of two or more may be used.

The vinyl monomers containing hydrolysable silyl groups are not particularly limited as long as they are vinyl monomers having at least one hydrolysable silyl group. Examples include vinyl silanes such as vinyl trimethoxysilane, vinyl triethoxysilane, vinyl methyl dimethoxysilane and vinyl dimethyl methoxysilane; acrylic acid esters containing silyl groups, such as trimethoxysilylpropyl acrylate, triethoxysilylpropyl acrylate and methyl dimethoxysilylpropyl acrylate; methacrylic acid esters containing silyl groups, such as trimethoxysilylpropyl methacrylate, triethoxysilylpropyl methacrylate, methyl dimethoxysilylpropyl methacrylate and dimethyl methoxysilylpropyl methacrylate; vinyl ethers containing silyl groups, such as trimethoxysilylpropyl vinyl ether; and vinyl esters containing silyl groups, such as vinyl trimethoxysilyl undecanoate.

When the crosslinked polymer is crosslinked with a crosslinkable monomer, the amount of this crosslinkable monomer used is preferably 0.1 mass parts or more and 2.0 mass parts or less, or more preferably 0.3 mass parts or more and 1.5 mass parts or less, or still more preferably 0.5 mass parts or more and 1.5 mass parts or less per 100 mass parts of the total amount of monomers (non-crosslinkable monomers) other than the crosslinkable monomer. An amount of at least 0.1 mass parts of the crosslinkable monomer is desirable from the standpoint of the binding ability and the stability of the electrode slurry, while the crosslinked polymer tends to be more stable if the amount is not more than 2.0 mass parts.

Similarly, the amount of the crosslinkable monomer used is preferably from 0.02 to 0.7 mol % or more preferably from 0.03 to 0.4 mol % of the of the total amount of monomers (non-crosslinkable monomers) other than the crosslinkable monomer.

The glass transition temperature (Tg) of the polymer block (B) is preferably at least 50° C. in order to obtain good binding ability. The Tg may also be at least 70° C., or at least 80° C., or at least 90° C., or at least 100° C. for example. The maximum value Tg is 350° C. due to restrictions on the constituent monomer units that can be used. The Tg may also be not more than 300° C., or not more than 280° C., or not more than 250° C. for example.

<Block Polymer>

The block copolymer is not particularly limited as long as it has at least one polymer block (A) and at least one polymer block (B) and may for example be an (AB) diblock copolymer of the polymer block (A) and the polymer block (B), an (ABA) triblock copolymer consisting of the polymer block (A)/polymer block (B)/polymer block (A), or a (BAB) triblock copolymer or other types of block copolymers of polymer block (A) and (B). It may also have an (ABC) or (ABCA) structure or other types of block copolymers including a polymer block (C) in addition to the polymer blocks (A) and (B). Among these, the block copolymer preferably has an A-(BA)n structure (in which n is 1 or an integer greater than 1). This structure is desirable because the microphase-separated structure expressed by the block copolymer forms bridging structures between domains. This A-(BA)n structure may be present throughout or in part of the copolymer, and for example, a copolymer having a (BABAB) structure may be possible. The block polymer may also be a mixture of two or more kinds of block polymers having the diblock structures and triblock structures described above. A polymer consisting only of the polymer block (A) or a polymer consisting only of the polymer block (B) or other polymer may also be included in addition to the block polymer.

The ratio of the polymer block (A) in the block copolymer is not particularly limited but may be 0.1 mass % or more and 80 mass % or less for example from the standpoint of binding ability. The ratio of the polymer block (A) may also be at least 0.5 mass %, or at least 1.0 mass %, or at least 2.0 mass %, or at least 5.0 mass %, or at least 10 mass %, or at least 20 mass %. The ratio of the polymer block (A) may also be not more than 70 mass %, or not more than 50 mass %, or not more than 30 mass %, or not more than 10 mass %.

The ratio of the polymer block (B) in the block polymer may be 20 mass % or more and 99.9 mass % or less. Within this range, good binding ability can be obtained. The ratio of the polymer block (B) may also be at least 30 mass %, or at least 50 mass %, or at least 70 mass %, or at least 90 mass %. The ratio of the polymer block (B) may also be not more than 99.5 mass %, or not more than 99 mass %, or not more than 98 mass %, or not more than 95 mass %, or not more than 90 mass %, or not more than 80 mass %.

The combined amount of the polymer block (A) and polymer block (B) as a percentage of the block polymer is preferably at least 50 mass %, or more preferably at least 70 mass %, or still more preferably at least 80 mass %, or most preferably at least 90 mass %. The combined amount of the polymer block (A) and polymer block (B) as a percentage of the block polymer may also be 100 mass %.

The mass ratio of the polymer block (A) and the polymer block (B) in the block copolymer is not particularly limited but may be from 0.1 to 80/20 to 99.9 for example. Within this range, good binding ability can be obtained. The ratio may also be 0.5 to 70/30 to 99.5, or 1.0 to 50/50 to 99, or 5.0 to 30/70 to 95, or 10 to 30/70 to 99.

In the composition of the teaching, the block polymer is preferably used in the form of a salt in which the acid groups such as carboxyl groups derived from ethylenically unsaturated carboxylic acid monomers have been neutralized to a degree of neutralization of at least 50 mol %. The degree of neutralization is preferably at least 60 mol %, or more preferably at least 70 mol %, or still more preferably at least 80 mol %, or yet more preferably at least 85 mol %, or especially at least 90 mol %. The maximum degree of neutralization is 100 mol % and may also be not more than 98 mol % or not more than 95 mol %. The range of the degree of neutralization can be obtained by combining these minimum and maximum values and may be for example 50 mol % or more and 100 mol % or less, or 70 mol % or more and 100 mol % or less, or 80 mol % or more and 100 mol % or less. A degree of neutralization is at least 50 mol % is desirable for obtaining good water swellability and a dispersion stabilizing effect. If the degree of neutralization is at least 80 mol %, on the other hand, the viscosity of the composition (electrode slurry) containing the active material and other materials is greatly reduced. This is desirable because it allows an electrode to be obtained with a smooth surface. It also makes it possible to increase the concentration of the composition, which is desirable from a productivity standpoint because it is then possible to reduce the amount of solvent to be removed by drying.

In this Description, the degree of neutralization can be calculated from the input values of the monomers having acid groups such as carboxyl groups and the neutralizing agent used for neutralization. The degree of neutralization can be confirmed by drying the crosslinked polymer or salt thereof for 3 hours under reduced pressure conditions at 80° C., subjecting the resulting powder to IR measurement. and comparing the intensities of the peak derived from the C=O groups of the carboxylic acid and the peak derived from the C=O groups of the carboxylate.

The type of salt of the block polymer is not particularly limited, but examples include alkali metal salts of lithium, sodium and potassium alkali earth metal salts such as calcium salts and barium salts; metal salts such as magnesium salts, aluminum salts, ammonium salts, and organic amine salts. Among these, an alkali metal salt or magnesium salt is desirable for avoiding adverse effect on the battery characteristics, while an alkali metal salt is more desirable, and a lithium salt or potassium salt is especially desirable.

The particle diameter of the block polymer when dried (dried particle diameter) is not particularly limited but may be a volume-based median diameter in the range of 0.03 microns or more and 3 microns or less for example. The particle diameter range may also be 0.1 microns or more and 1 micron or less, or 0.3 microns or more and 0.8 microns or less.

The water-swelled particle diameter of the block polymer is also not particularly limited but may be a volume-based median diameter in the range of 0.1 microns or more and 10.0 microns or less. This particle diameter range may also be 0.1 microns or more and 8.0 microns or less, or 0.1 microns or more and 7.0 microns or less, or 0.2 microns or more and 5.0 microns or less, or 0.5 microns or more and 3.0 microns or less.

The water-swelled particle diameter is obtained by measuring the particle diameter when the block polymer has been neutralized to a degree of 80 to 100 mol % based on carboxyl groups and dispersed in water. If the crosslinked polymer is not neutralized or neutralized to a degree of less than 80 mol %, it can be neutralized to a degree of 80 to 100 mol % with an alkali metal hydroxide or the like and then dispersed in water before the particle diameter is measured.

The particle size distribution is the volume-based average divided by the number-based average of the water-swelled particle diameter, and may be for example not more than 10, or not more than 5.0, or not more than 3.0, or not more than 1.5. The minimum particle size distribution is normally 1.0.

<Method for Manufacturing Block Polymer>

A known manufacturing method may be used for manufacturing the block copolymer, with no particular restrictions as long as the method yields a block copolymer containing the polymer block (A) and polymer block (B). Examples include various methods using controlled polymerization, such as living radical polymerization and living anionic polymerization, and methods of coupling together polymers having functional groups. In another method, for example a macromonomer having the polymer block (A) may also be copolymerized with monomers for constituting the polymer block (B) to thereby obtain a polymer having structural units composed of polymer block (A)/polymer block (B)/polymer block (A) in the molecule. Of these, a living radical polymerization method is preferred for ease of operation and because it is applicable to a wide range of monomers.

The living radical polymerization may use any kind of process such as a batch process, semi-batch process, continuous tube polymerization process, continuous stirred tank reactor (CSTR) process. For the polymerization format, various formats including bulk polymerization without a solvent, solution polymerization in a solvent system, emulsion polymerization in water, mini-emulsion polymerization and suspension polymerization may be adopted.

The type of living radical polymerization method is not particularly limited, and various polymerization methods such as reversible addition-fragmentation chain-transfer polymerization (RAFT), nitroxide-mediated radical polymerization (NMP), atom transfer radical polymerization (ATRP), polymerization using organotellurium compounds (TERP), polymerization using organic antimony compounds (SBRP), polymerization using organic bismuth compounds (BIRP) and iodine transfer polymerization may be adopted. Among these, a RAFT method is desirable for ease of polymerization control and for obtaining a block polymer with excellent binding ability.

In RAFT methods, controlled polymerization is accomplished through a reversible chain transfer reaction in the presence of a specific polymerization control agent (RAFT agent) and a common free radical polymerization initiator. Various known RAFT agents such as dithioester compounds, xanthate compounds, trithiocarbonate compounds and dithiocarbamate compounds may be used for the RAFT agent. The RAFT agent may be either a monofunctional agent having only one active site, or a bifunctional or higher functional RAFT agent. A bifunctional RAFT agent is desirable for efficiently ad easily obtaining a block copolymer having the above A-(BA)n structure.

The amount of the RAFT agent is adjusted appropriately according to the monomers used, the type of RAFT agent and the like.

The polymerization initiator used in polymerization by a RAFT method may be a known radical polymerization initiator such as an azo compound, organic peroxide compound, persulfate salt, but an azo compound is preferred because it is easy to handle safely and unlikely to cause side reactions during radical polymerization. Specific examples of such azo compounds include 2,2'-azobis isobutyronitrile, 2,2'-azobis (2,4-dimethylvaleronitrile), 2,2'-azobis (4-methoxy-2,4-dimethylvalerontrile), dimethyl-2,2'-azobis (2-methylpropionate), 2,2'-azobis (2-methylbutyronitrile), 1,1'-azobis (cyclohexane-1-carbonitrile), 2,2'-azobis [N-(2-propenyl)-2-methylpropionamide] and 2,2'-azobis (N-butyl-2-methylpropionamide). One kind of radical polymerization initiator or a combination of two or more kinds may be used.

The use ratio of the radical polymerization initiator is not particularly limited, but preferably not more than 0.5 mol or more preferably not more than 0.2 mol of the radical polymerization initiator is used per 1 mol of the RAFT agent in order to obtain a polymer with a narrow molecular weight distribution. To achieve a stable polymerization reaction, a minimum of 0.001 mol of the radical polymerization initiator is used per 1 mol of the RAFT agent. The amount of the radical polymerization initiator per 1 mol of the RAFT agent is preferably in the range of 0.001 mol or more and 0.5 mol or less, or more preferably in the range of 0.005 mol or more and 0.2 mol or less.

The reaction temperature during the polymerization reaction by the RAFT method is preferably 30° C. or more and 120° C. or less, or more preferably 40° C. or more and 110° C. or less, or still more preferably 50° C. or more and 100° C. or less. If the reaction temperature is at least 30° C., the polymerization reaction can proceed smoothly. If the reaction temperature is not more than 120° C., side reactions can be controlled, and there are fewer restrictions on what initiators and solvents can be used.

A known polymerization solvent may be used in living radical polymerization in these disclosures. Specific examples include aromatic compounds such as benzene, toluene, xylene and anisole, ester compounds such as methyl acetate, ethyl acetate, propyl acetate and butyl acetate, ketone compounds such as acetone and methyl ethyl ketone, and dimethyl formamide, acetonitrile, dimethyl sulfoxide, alcohols and water.

From a productivity standpoint, the polymer block (B) is preferably obtained by precipitation polymerization and suspension polymerization (reverse-phase suspension polymerization) when manufacturing the block polymer. To obtain better performance in terms of binding ability and other properties, a heterogenous polymerization method such as precipitation polymerization, suspension polymerization or emulsion polymerization is preferred, and a precipitation polymerization method is especially preferred.

Precipitation polymerization is a method of manufacturing a polymer by performing a polymerization reaction in a solvent that dissolves the starting material (unsaturated monomer) but effectively does not dissolve the resulting polymer. As polymerization progresses, the polymer particles grow larger by aggregation and polymer growth, resulting in a dispersion of polymer particles micrometers to tens of micrometers in size formed by secondary aggregation of primary particles tens of nanometers to hundreds of nanometers in size. A dispersion stabilizer may also be used to control the particle size of the polymer.

Such secondary aggregation can also be suppressed by selecting the dispersion stabilizer, polymerization solvent and the like. In general, precipitation polymerization in which secondary aggregation is suppressed is referred to as dispersion polymerization.

In the case of precipitation polymerization, the polymerization solvent may be selected from water and various organic solvents and other solvents depending on the type of monomer used and the like. In order to obtain a polymer with a longer primary chain length, it is desirable to use a solvent with a small chain transfer constant.

Specific examples of polymerization solvents include water-soluble solvents such as methanol, t-butyl alcohol, acetone, methyl ethyl ketone, acetonitrile and tetrahydrofuran, and benzene, ethyl acetate, dichloroethane, n-hexane, cyclohexane and n-heptane, and one of these or a combination of two or more may be used. Mixed solvents of these with water may also be used. In the present teaching, a water-soluble solvent refers to a solvent having a solubility of more than 10 g/100 ml in water at 20° C.

Among these solvents, methyl ethyl ketone and acetonitrile are preferred because, for example, polymerization stability is good, with less production of coarse particles and adhesion to the reaction vessel, because the precipitated polymer fine particles are less liable to secondary aggregation (or any secondary aggregates that occur are easily broken up in an aqueous medium), because the chain transfer constant is low, resulting in a polymer with a high degree of polymerization (long primary chain length), and because the operation is easier in the process neutralization described below.

To achieve a stable and rapid neutralization reaction during this process neutralization, moreover, it is desirable to add a small amount of a high polar solvent to the polymerization solvent. Desirable examples of this highly polar solvent are water and methanol. The amount of the highly polar solvent used is preferably 0.05 to 20.0 mass %, or more preferably 0.1 to 10.0 mass %, or still more preferably 0.1 to 5.0 mass %, or yet more preferably 0.1 to 1.0 mass % based on the total mass of the medium. If the ratio of the highly polar solvent is at least 0.05 mass %, the effect on the neutralization reaction is achieved, while if it is not more than 20.0 mass %, there is no adverse effect on the polymerization reaction. When polymerizing a highly hydrophilic ethylenically unsaturated carboxylic acid monomer such as acrylic acid, moreover, adding a highly polar solvent serves to increase the polymerization rate and make it easier to obtain a polymer with a long primary chain length. Among the highly polar solvents, water in particular is desirable because it has a strong improvement effect on the polymerization rate.

When obtaining the polymer block (B), the monomer concentration during polymerization is preferably high in order to obtain a polymer with a long primary chain length. If the monomer concentration is too high, however, agglomeration of the polymer particles progresses more easily, and there is a risk of a runaway polymerization reaction because it is difficult to control the polymerization heat. Consequently, in the case of a precipitation polymerization method for example, the monomer concentration at the start of polymerization is normally in the range of about 2 to 40 mass %, or preferably 5 to 40 mass %.

In this Description, the "monomer concentration" is the concentration of monomers in the reaction solution at the point when polymerization begins.

The polymer block (B) may also be manufactured by performing a polymerization reaction in the presence of a basic compound. By performing a polymerization reaction in the presence of a basic compound, it is possible to stably perform a polymerization reaction even under high monomer concentration conditions. The monomer concentration may be at least 13.0 mass %, or preferably at least 15.0 mass %, or more preferably at least 17.0 mass %, or still more preferably at least 19.0 mass %, or yet more preferably at least 20.0 mass %. Still more preferably the monomer concentration is at least 22.0 mass %, or even more preferably at least 25.0 mass %. In general, the higher the monomer concentration during polymerization, the higher the molecular weight, and when the present polymer is a crosslinked polymer, a polymer having a long primary chain length can be manufactured.

The maximum monomer concentration differs depending on the types of monomers and solvents used, the polymerization method and the various polymerization conditions and the like, but if the heat of the polymerization reaction can be removed, the maximum is about 40% in the case of precipitation polymerization as discussed above, or about 50% in the case of suspension polymerization, or about 70% in the case of emulsion polymerization.

The basic compound is a so-called alkaline compound, and either an inorganic basic compound or an organic basic compound may be used. By performing a polymerization reaction in the presence of a basic compound, it is possible to stably perform a polymerization reaction even under high monomer concentration conditions in excess of 13.0 mass % for example. Moreover, a polymer obtained by polymerization at such a high monomer concentration is superior from the standpoint of binding ability because it generally has a high molecular weight (a long primary chain length).

Examples of inorganic basic compounds include alkali metal hydroxides such as lithium hydroxide, sodium hydroxide and potassium hydroxide, and alkali earth metal hydroxides such as calcium hydroxide and magnesium hydroxide, and one or two or more kinds of these may be used.

Examples of organic basic compounds include ammonia and organic amine compounds such as monoethylamine, diethylamine and triethylamine. and one or two or more kinds of these may be used. Of these, an organic amine compound is desirable from the standpoint of polymerization stability and the binding ability of a binder containing the resulting polymer or a salt thereof.

The amount of the basic compound used is preferably in the range of 0.001 mol % or more and 4.0 mol % or less of the ethylenically unsaturated carboxylic acid monomer. If the amount of the basic compound is within this range, a smooth polymerization reaction can be achieved. The amount used may also be 0.05 mol % or more and 4.0 mol % or less, or 0.1 mol % or more and 4.0 mol % or less, or 0.1 mol % or more and 3.0 mol % or less, or 0.1 mol % or more and 2.0 mol % or less.

In this Description, the amount of the basic compound used represents the molar concentration of the basic compound used relative to the ethylenically unsaturated carboxylic acid monomer, not the degree of neutralization. In other words, the valence of the basic compound used is not considered.

The block polymer can be obtained in a powder state by treating a reaction solution containing the block polymer with heat and/or reduced pressure to remove the solvent. In this case, solid-liquid separation treatment such as centrifugation and filtration and washing treatment using water, methanol or the same solvent as the polymerization solvent are preferably applied following the polymerization reaction to remove unreacted monomers (and salts thereof) and impurities derived from the initiator and the like before the solvent is removed. When such washing treatment is performed, even if the block polymer undergoes secondary aggregation the aggregates can be easily broken up during use, and good performance in terms of binding ability and battery characteristics can be obtained because residual unreacted monomers are also removed.

In this manufacturing method, the solvent can be removed in a drying step after the block polymer has been neutralized (hereinafter also called "process neutralization") by adding an alkali compound to a dispersion containing the block polymer obtained after the polymerization reaction. Alternatively, a powder of the polymer may be obtained without performing such process neutralization, and an alkali compound may then be added to neutralize the polymer when preparing the electrode slurry (hereinafter called "post-neutralization"). Of these, process neutralization is preferred because it tends to make the secondary aggregates easier to break up.

2. Electrode Mixture Layer Composition for a Secondary Battery

The electrode mixture layer composition for a secondary battery of the present teaching contains a binder containing the block polymer, together with an active material and water.

The amount of the block polymer used in the composition is, for example, 0.1 mass parts or more and 20 mass parts or less, or for example, 0.2 mass parts or more and 10 mass parts or less, or for example, 0.3 mass parts or more and 8 mass parts or less, or for example, 0.4 mass parts or more 5 mass parts or less of the total amount of 100 mass parts of the active material. If the amount of the block polymer is less than 0.1 mass parts, sufficient binding ability may not be obtained. Moreover, dispersion stability of the active material and the like may be inadequate, detracting from the uniformity of the formed mixture layer. If the amount of the block polymer exceeds 20 mass parts, on the other hand, the electrode composition may become highly viscous, and coating performance on the collector may decrease. Consequently, spots and irregularities may occur in the resulting mixture layer, adversely affecting the electrode characteristics.

If the amount of the block polymer is within the aforementioned range, a composition with excellent dispersion stability can be obtained, and it is also possible to obtain a mixture layer with extremely high adhesiveness to the collector, resulting in improved battery durability. Moreover, because the block polymer has sufficient ability to bind the active material even in a small quantity (such as 5 mass % or less), and because it has carboxy anions, it can yield an electrode with little interface resistance and excellent high-rate characteristics.

Among the active materials described above, lithium salts of transition metal oxides may be used as positive electrode active materials, and for example laminar rock salt-type and spinel-type lithium-containing metal oxides may be used. Specific examples of compounds that are laminar rock salt-type positive electrode active materials include lithium cobaltate, lithium nickelate, and NCM $\{Li(Ni_x,Co_y,Mn_z), x+y+z=1\}$ and NCA $\{Li(Ni_{1-a-b}Co_aAl_b)\}$, which are referred to as ternary materials. Examples of spinel-type positive electrode active materials include lithium manganate. Apart from oxides, phosphate salts, silicate salts and sulfur and the like may also be used. Examples of phosphate salts include olivine-type lithium iron phosphate. Among of these may be used alone as a positive electrode active material, or two or more may be combined and used as a mixture or composite.

When a positive electrode active material containing a laminar rock salt-type lithium-containing metal oxide is dispersed in water, the dispersion exhibits alkalinity because the lithium ions on the surface of the active material are exchanged for hydrogen ions in the water. There is thus the risk of corrosion of aluminum foil (Al) or the like, which is a common positive electrode collector material. In such cases, it is desirable to neutralize the alkali component eluted from the active material by using the unneutralized or partially neutralized block polymer as the binder. The amount of the unneutralized or partially neutralized block polymer used is preferably such that the amount of unneutralized carboxyl groups in the block polymer is at least equivalent to the amount of alkali eluted from the active material.

Because all the positive electrode active materials have low electrical conductivity, a conductive aid is normally added and used. Examples of conductive aids include carbon materials such as carbon black, carbon nanotubes, carbon fiber, graphite fine powder, and carbon fiber. Of these, carbon black, carbon nanotubes and carbon fiber are preferred to make it easier to obtain excellent conductivity. As the carbon black, ketjen black and acetylene black are preferable. One of these conductive aids may be used alone, or a combination of two or more may be used. The amount of the conductive aid used may be, for example, 0.2 to 20 mass parts, or for example, 0.2 to 10 mass parts of the total amount of 100 mass parts of the active material in order to achieve both conductivity and energy density. The positive electrode active material may also be a conductive carbon material that has been surface coated.

Examples of negative electrode active materials include carbon materials, lithium metal, lithium alloys and metal oxides, and one of these or a combination of two or more may be used. Of these, an active material formed of a carbon material such as natural graphite, artificial graphite, hard carbon, and soft carbon (hereinafter referred to as a "carbon-based active material") is preferred, and hard carbon or a graphite such as natural graphite or artificial graphite is more preferred. In the case of graphite, spheroidized graphite is desirable from the standpoint of battery performance, and the particle size thereof is in the range of, for example, 1 to 20 μm, or for example, 5 to 15 μm. To increase the energy density, metals, metal oxides or the like capable of occluding lithium, such as silicon and tin, can also be used as negative electrode active materials. Among these, silicon has a higher capacity than graphite, and an active material formed of a silicon material such as silicon, a silicon alloy or a silicon oxide such as silicon monoxide (SiO) (hereinafter referred to as a "silicon-based active material") may be used. Although these silicon-based active materials have high capacities, however, the volume change accompanying charging and discharging is large. Consequently, this is preferably combined with the above carbon active material. In this case, the electrode material may break down and the cycle characteristics (durability) may be greatly reduced if the compounded amount of the silicon active material is too high. From this perspective, when a silicon active material is included, the amount used is for example not more than 60 mass % or for example not more than 30 mass % of the amount of the carbon active material.

In the binder containing the block polymer, the polymer has a structural unit (component (a)) derived from an ethylenically unsaturated carboxylic acid monomer. The component (a) here has strong affinity for silicon active materials and exhibits good binding ability. It is thought that because of this, the binder of the teaching is effective for improving the durability of the resulting electrode because exhibits excellent binding ability even when used with a high-capacity type active material containing a silicon active material.

Because the carbon active material itself has good electrical conductivity, it may not be necessary to add a conductive aid. When a conductive aid is added to further reduce resistance or the like, the amount used is not more than 10 mass parts, for example or not more than 5 mass parts, for example per 100 mass parts of the total active materials from the standpoint of energy density.

When the composition is in slurry form, the amount of the active material used is for example from 10 to 75 mass %, or for example from 30 to 65 mass % of the total amount of the composition. If the amount of the active material is at least 10 mass % it is possible to control migration of the binder and the like, and this is also advantageous from the standpoint of medium drying costs. If it is not more than 75 mass %, on the other hand, the flowability and coating properties of the composition can be ensured, and a uniform mixture layer can be formed.

When the composition is prepared as a wet powder, on the other hand, the amount of the active material used is for example in the range of from 60 to 97 mass %, or for example in the range of from 70 to 90 mass % of the total amount of the composition. From the standpoint of energy density, the non-volatile components other than the active material, such as the binder and conductive aid, are preferably reduced as much as possible while maintaining the necessary binding ability and conductivity.

The composition uses water as a medium. This may also be made into a mixed medium with a lower alcohol such as methanol or ethanol, a carbonate such as ethylene carbonate, a ketone such as acetone or a water-soluble organic solvent such as tetrahydrofuran or N-methylpyrrolidone in order to adjust the consistency, drying properties and other properties of the composition. The percentage of water in the mixed medium is, for example, at least 50 mass %, or for example at least 70 mass %.

When the composition is made into a coatable slurry, the content of the medium including water as a percentage of the total composition may be from 25 to 90 mass % for example, or from 35 to 70 mass % for example from the standpoint of the slurry coating properties, the energy costs required for drying, and the productivity. In the case of a pressable wet powder, the content of the medium may be for example in the range of from 3 to 40 mass %, or for example in the range of from 10 to 30 mass % considering the uniformity of the mixture layer after pressing.

The binder of the teaching may consist only of the block polymer, but this may also be combined with another binder component such as styrene/butadiene latex (SBR), acrylic latex and polyvinylidene fluoride latex. When another binder component is used, the amount thereof may be for example from 0.1 to 5 mass parts, or for example from 0.1 to 2 mass parts, or for example, from 0.1 to 1 mass part per 100 mass parts of the total amount of the active materials. If the amount of the other binder component exceeds 5 mass parts, resistance increases, and the high-rate characteristics may be inadequate. Among those given above, styrene/butadiene latex is desirable for achieving an excellent balance of binding ability and flex resistance.

This styrene/butadiene latex is an aqueous dispersion of a copolymer having a structural unit derived from an aromatic vinyl monomer such as styrene and a structural unit derived from an aliphatic conjugated diene monomer such as 1,3-butadiene. Examples of the aromatic vinyl monomer include α-methylstyrene, vinyltoluene and divinylbenzene as well as styrene, and one of these or two or more may be used. The structural unit derived from the aromatic vinyl monomer in the copolymer described above may constitute, for example, 20 to 70 mass %, or for example, 30 to 60 mass % of the copolymer from the standpoint of binding ability primarily.

Examples of the aliphatic conjugated diene monomer include 2-methyl-1,3-butadiene, 2,3-dimethyl-1,3-butadiene and 2-chloro-1,3-butadiene as well as 1,3-butadiene, and one of these or two or more may be used. The structural unit derived from the aliphatic conjugated diene monomer may constitute, for example, 30 to 70 mass %, or for example, 40 to 60 mass % of the copolymer from the standpoint of the binding ability of the binder and the flexibility of the resulting electrode.

Apart from the above monomers, other monomers including nitrile group-containing monomers such as (meth)acrylonitrile, carboxyl group-containing monomers such as (meth)acrylic acid, itaconic acid and maleic acid and ester group-containing monomers such as methyl (meth)acrylate may be included as copolymerization monomers in the styrene/butadiene latex to further increase the performance such as binding ability.

The structural unit derived from this other monomer may be contained in the copolymer in the amount of, for example, 0 to 30 mass %, or for example, 0 to 20 mass %.

The composition has the above active material, water and a binder as essential components, and is obtained by mixing these components by known methods. The method for mixing the components is not particularly limited, and a known method may be used, but a method of first dry blending the powder components such as the active material, the conductive aid and the carboxyl group-containing polymer particle (binder), and then mixing this with a dispersion medium such as water and dispersing and kneading the mixture is preferred. When the electrode mixture layer composition is obtained in slurry form, it is desirable to produce a finished slurry without dispersion irregularities or aggregation. A known mixer such as a planetary mixer, thin-film swivel mixer or self-rotating mixer may be used as the mixing means, but a thin film swivel mixer is preferred for obtaining a well dispersed state in a short amount of time. When using a thin-film swivel mixer, moreover, the mixture is preferably pre-dispersed with a stirring apparatus such as a Disper. In terms of the viscosity of the slurry, the B-type viscosity at 60 rpm is for example from 500 to 100,000 mPa·s, or for example from 1,000 to 50,000 mPa·s.

When the composition is obtained in a wet powder state, on the other hand, it is preferably kneaded into a uniform state without concentration irregularities using a Henschel mixer, blender, planetary mixer, twin-screw kneader or the like.

3. Secondary Battery Electrode

The secondary battery electrode of the teaching is provided with a mixture layer formed from the composition of the teaching on the surface of a collector made of copper, aluminum or other conductive materials. The mixture layer is formed by first coating the composition on the surface of the collector, and then drying it to remove the water and other media. The method of coating the composition is not particularly limited, and a known method such as a doctor blade method, dipping, roll coating, comma coating, curtain coating, gravure coating or extrusion may be adopted. The drying may also be accomplished by a known method such as warm air blowing, pressure reduction, (far) infrared exposure or microwave exposure.

The mixture layer obtained after drying is normally subjected to compression treatment with a metal press, roll press or the like. By compressing, the active material and the binder are brought into close contact with each other, and the strength of the mixture layer and the adhesion to the collector can be improved. Compression may reduce the thickness of the mixture layer to, for example, about 30% to 80% of the pre-compression thickness, and the thickness of the mixture layer after compression is normally about 4 to 200 µm.

4. Secondary Battery

A secondary battery can be prepared by providing a separator and an electrolyte solution with the secondary battery electrode of the present teaching. The electrolyte solution may be in liquid form or in gel form.

The separator is disposed between the positive and negative electrodes of the battery, and serves to prevent short-circuits due to contact between the electrodes, hold the electrolyte solution and ensure ion conductivity. The separator is an insulating finely porous film, and preferably has good ion permeability and mechanical strength. Specific examples of materials that can be used include polyolefins such as polyethylene and polypropylene, and polytetrafluoroethylene.

For the electrolyte solution, a known electrolyte solution commonly used can be used in accordance with the type of active materials. For lithium ion secondary batteries, specific examples of the solvent include cyclic carbonates with high dielectric constants and good ability to dissolve electrolytes, such as propylene carbonate and ethylene carbonate, and linear carbonates with low viscosity, such as ethyl methyl carbonate, dimethyl carbonate and diethyl carbonate, and these may be used alone or as a mixed solvent. A lithium salt such as $LiPF_6$, $LiSbF_6$, $LiBF_4$, $LiClO_4$ or $LiAlO_4$ is dissolved in this solvent and used as the electrolyte solution. In a nickel-hydride secondary battery, a potassium hydroxide aqueous solution may be used as the electrolyte solution. The secondary battery is obtained by making the positive electrode plate and negative electrode plate into a spiral or laminate structure with a separator between the two and enclosing this structure in a case or the like.

As explained above, the binder for a secondary battery electrode disclosed here exhibits excellent binding ability with the electrode material in the mixture layer and excellent adhesiveness with the collector. Hence, a secondary battery provided with an electrode obtained using this binder can ensure good integrity and is expected to provide good durability (cycle characteristics) even after repeated charging and discharging, making it ideal for rechargeable vehicle batteries and the like.

Examples

The present teaching is described in detail below based on examples. However, the present teaching is not limited by these examples. In the following, "parts" and "%" mean parts by mass and % by mass unless otherwise specified.

<<Manufacturing Polymer Block (A)>>

(Manufacturing Example 1-1: Manufacturing Polymer A)

2.0 parts of dibenzyl trithiocarbonate (bifunctional RAFT agent, hereinafter also called "DBTTC"), 0.014 parts of 2,2'-azobis (2-methylbutyronitrile) (Japan Finechem, product name ABN-E), 62 parts of N-phenyl maleimide (hereinafter also called "PhMI"), 38 parts of styrene (hereinafter also called "St") and 222 parts of acetonitrile were loaded into a 1 L flask equipped with a stirrer and a thermometer, the mixture was thoroughly degassed by nitrogen bubbling, and polymerization was initiated in a 70° C. thermostatic tank. After 4 hours, this was cooled to room temperature to stop the reaction. The polymerization solution was re-precipitated and purified from methanol/water (90/10, vol %) and vacuum dried to obtain a polymer A. The reaction rate based on gas chromatography measurement was 75% relative to the total amount of PhMI and St used. Based on GPC measurement under the conditions shown below, the polymer A had a number-average molecular weight (Mn) of 10,200 (calculated in terms of polystyrene) and a weight-average molecular weight (Mw) of 15,300, and Mw/Mn was calculated to be 1.51. The glass transition temperature (Tg) of the polymer A based on DSC measurement under the conditions shown below was 210° C.

(GPC Measurement Conditions)
Column: Tosoh Corp. TSKgel SuperMultipore HZ-M×4
Solvent: Tetrahydrofuran
Temperature: 40° C.
Detector: R1
Flow rate: 600 µl/min (Glass Transition Temperature (Tg) Measurement Conditions)
The Tg of the resulting polymer was determined from the intersection of the baseline of the heat flux curve obtained by differential scanning calorimetry with the tangent at the inflexion point. The heat flux curve was obtained by cooling about 10 mg of the sample to −60° C., holding it for 5 minutes, raising the temperature to 250° C. at 10° C./min, then cooling to −60° C. and holding for 5 minutes, and then raising the temperature to 250° C. at 10° C./min.
Measurement device: TA Instrument Q-100
Measurement atmosphere: Nitrogen atmosphere (Manufacturing Example 1-2: Manufacturing Polymer B)
2.0 parts of DBTTC, 0.41 parts of ABN-E, 25 parts of acrylonitrile (hereinafter also called "AN"), 75 parts of St and 67 parts of anisole were loaded into a 1 L flask equipped with a stirrer and a thermometer, the mixture was thoroughly degassed by nitrogen bubbling, and polymerization was initiated in an 80° C. thermostatic tank. After 4 hours, this was cooled to room temperature to stop the reaction. The polymerization solution was re-precipitated and purified from methanol/water (90/10, vol %) and vacuum dried to obtain a polymer B. The reaction rate based on gas chromatography measurement was 72% relative to the total amount of AN and St used, and when measured by GPC under conditions similar to Manufacturing Example 1-1, the Mn was 11,900, the Mw was 15,500 and Mw/Mn was 1.30. The Tg was 101° C. according to DSC measurement.

(Manufacturing Example 1-3: Manufacturing Polymer C)
2.0 parts of DBTTC, 0.019 parts of ABN-E, 100 parts of phenoxyethyl acrylate (Kyoeisha Chemical, product name "Light Acrylate PO-A") and 53 parts of acetonitrile were loaded into a 1 L flask equipped with a stirrer and a thermometer, the mixture was thoroughly degassed by nitrogen bubbling, and polymerization was initiated in a 70° C. thermostatic tank. After 3 hours, this was cooled to room temperature to stop the reaction. The polymerization solution was re-precipitated and purified from methanol/water (90/10, vol %) and vacuum dried to obtain a polymer C. The reaction rate based on gas chromatography measurement was 79% relative to the total amount of phenoxyethyl acrylate used, and when measured by GPC under conditions similar to Manufacturing Example 1-1, the Mn was 9,100, the Mw was 10,700, and Mw/Mn was 1.17. The Tg was −20° C. according to DSC measurement.

(Manufacturing Example 1-4: Manufacturing Polymer D)
2.0 parts of DBTTC, 0.019 parts of ABN-E, 100 parts of butyl acrylate (hereinafter also called "BA") and 53 parts of acetonitrile were loaded into a 1 L flask equipped with a stirrer and a thermometer, the mixture was thoroughly degassed by nitrogen bubbling, and polymerization was initiated in a 70° C. thermostatic tank. After 3 hours, this was cooled to room temperature to stop the reaction. The polymerization solution was re-precipitated and purified from methanol/water (90/10, vol %) and vacuum dried to obtain a polymer D. The reaction rate based on gas chromatography measurement was 77% relative to the total amount of BA used, and when measured by GPC under conditions similar to Manufacturing Example 1-1, the Mn was 8,900, the Mw was 10,200, and Mw/Mn was 1.15. The Tg was −50° C. according to DSC measurement.

(Manufacturing Example 1-5: Manufacturing Polymer E)
2.0 parts of DBTTC, 0.070 parts of ABN-E, 48 parts of maleic anhydride (hereinafter also called "MLA anhydride"), 52 parts of St and 207 parts of acetonitrile were loaded into a 1 L flask equipped with a stirrer and a thermometer, the mixture was thoroughly degassed by nitrogen bubbling, and polymerization was initiated in a 70° C. thermostatic tank. After 4 hours, this was cooled to room temperature to stop the reaction. The polymerization solution was reprecipitated and purified from toluene, and vacuum dried to obtain a polymer E. The reaction rate based on gas chromatography measurement was 71% relative to the total amount of MLA anhydride and St used, and when measured by GPC under conditions similar to Manufacturing Example 1-1, the Mn was 13,800, the Mw was 22,200, and Mw/Mn was 1.61. The Tg was 107° C. according to DSC measurement.

(Manufacturing Example 1-6: Manufacturing Polymer F)
2.0 parts of DBTTC, 0.022 parts of ABN-E, 100 parts of acryloyl morpholine (hereinafter also called "ACMO") and 78 parts of acetonitrile were loaded into a 1 L flask equipped with a stirrer and a thermometer, the mixture was thoroughly degassed by nitrogen bubbling, and polymerization was initiated in a 70° C. thermostatic tank. After 4 hours, this was cooled to room temperature to stop the reaction. The polymerization solution was reprecipitated and purified from methanol, and vacuum dried to obtain a polymer F. The reaction rate based on gas chromatography measurement was 93% relative to the total amount of ACMO used, and when measured by GPC, the Mn was 12,500, the Mw was 13,400, and Mw/Mn was 1.07. Because PACMO (Poly-ACMO) is poorly soluble in TH-F, GPC measurement of the polymer F was performed under the following conditions. The Tg was 145° C. according to DSC measurement.

(GPC Measurement Conditions)
Column: Tosoh Corp. TSKgel SuperMultipore HM-M×3
Solvent: 10 mM LiBr/DMF
Temperature: 40° C.
Detector: R1
Flow rate: 300 µl/min (Manufacturing Example 1-7: Manufacturing Polymer G)
3.24 parts of 1-phenyl ethyl iodide (hereinafter also called "1-PEP"), 0.019 parts of ABN-E, 62 parts of PhMI, 38 pants of St and 221 pants of acetonitrile were loaded into a 1 L flask equipped with a stirrer and a thermometer, the mixture was thoroughly degassed by nitrogen bubbling, and polymerization was initiated in a 70° C. thermostatic tank. After 4 hours, this was cooled to room temperature to stop the reaction. The polymerization solution was re-precipitated and purified from methanol/water (90/10, vol %) and vacuum dried to obtain a polymer G. The reaction rate based on gas chromatography measurement was 74% relative to the total amount of PhMI and St used, and when measured by GPC under conditions similar to Manufacturing Example 1-1, the Mn was 13,100, the Mw was 31,100, and Mw/Mn was 2.37. The Tg was 213° C. according to DSC measurement.

The charged raw materials and physical property values for the polymers A through G obtained above are shown in Table 1.

TABLE 1

| | | | ME 1-1 | ME 1-2 | ME 1-3 | ME 1-4 | ME 1-5 | ME 1-6 | ME 1-7 |
|---|---|---|---|---|---|---|---|---|---|
| | Polymer block(A) | | Polymer A | Polymer B | Polymer C | Polymer D | Polymer E | Polymer F | Polymer G |
| Charged | Monomer | St | 38 | 75 | | | 52 | | 38 |
| raw | | PhMI | 62 | | | | | | 62 |
| materials | | AN | | 25 | | | | | |
| [parts] | | PEA | | | 100 | | | | |
| | | BA | | | | 100 | | | |
| | | MLA anhydride | | | | | 48 | | |
| | | ACMO | | | | | | 100 | |
| | Control agent (1) | DBTTC | 2.0 | 2.0 | 2.0 | 2.0 | 2.0 | 2.0 | |
| | Control agent (2) | 1-PEI | | | | | | | 3.24 |
| | Radical generator | ABN-E | 0.014 | 0.410 | 0.019 | 0.019 | 0.070 | 0.022 | 0.019 |
| | Solvent | Acetonitrile | 222 | | 53 | 53 | 207 | 78 | 221 |
| | | Anisole | | 67 | | | | | |
| Initial monomer concentration (wt %) | | | 31% | 59% | 65% | 65% | 32% | 56% | 31% |
| Polymerization time (h) | | | 4 | 4 | 3 | 3 | 4 | 4 | 4 |
| Polymerization temperature (° C.) | | | 70 | 80 | 70 | 70 | 70 | 70 | 70 |
| Monomer reaction rate (%) | | | 75% | 72% | 79% | 77% | 71% | 93% | 74% |
| Molecular weight | | Mn | 10,200 | 11,900 | 9,100 | 8,900 | 13,800 | 12,500 | 13,100 |
| | | Mw | 15,300 | 15,500 | 10,700 | 10,200 | 22,200 | 13,400 | 31,100 |
| | | Mw/Mn | 1.51 | 1.30 | 1.17 | 1.15 | 1.61 | 1.07 | 2.37 |
| Tg (° C.) | | | 210 | 101 | −20 | −50 | 107 | 145 | 213 |

The compounds used in Table 1 are defined below.
St: Styrene
PhMI: N-phenyl maleimide
AN: Acrylonitrile
PEA: Phenoxyethyl acrylate
BA: N-butyl acrylate
MLA anhydride: Maleic anhydride
ACMO: Acryloyl morpholine
DBTTC: Dibenzyl trithiocarbonate
1-PEI: 1-phenyl ethyl iodide
ABN-E: 2,2'-azobis (2-methylbutyronitrile) (Japan Finechem)

<<Manufacturing Block Polymer>>
(Manufacturing Example 2-1: Manufacturing Block Polymer R-1)

A reactor equipped with a stirrer, a thermometer, a reflux cooler and a nitrogen introduction pipe was used for polymerization.

567 parts of acetonitrile, 2.20 parts of deionized water, 100 parts of acrylic acid (hereinafter also called "AA"), 0.90 parts of trimethylol propane diallyl ether (Daiso Chemical Co. Neoallyl T-20), 1.0 part of the polymer A obtained in the Manufacturing Example 1-1, and triethylamine corresponding to 1.0 mol % of the AA were loaded into the reactor. The reactor was thoroughly purged with nitrogen, and heated to raise the internal temperature to 55° C. Once the internal temperature was confirmed to have stabilized at 55° C., 0.040 parts of 2,2'-azobis (2,4-dimethylvaleronitrile) (Wako Pure Chemical V-65) were added as a polymerization initiator, and this was taken as the polymerization start point because white turbidity was observed in the reaction solution. The monomer concentration was calculated to be 15.0%. The external temperature (water bath temperature) was adjusted to maintain the internal temperature at 55° C. as the reaction was continued, and once 6 hours had passed since the polymerization start point the internal temperature was raised to 65° C. The internal temperature was maintained at 65° C., cooling of the reaction solution was initiated once 12 hours had passed since the polymerization start point, and once the internal temperature had fallen to 25° C., 52.4 parts of a powder of lithium hydroxide monohydrate (hereinafter also called "LiOH·H₂O") were added. After addition, stirring was continued for 12 hours at room temperature to obtain a polymerization reaction solution in slurry form comprising particles of a block polymer R-1 as an ABA triblock polymer (Li salt, degree of neutralization 90 mol %) dispersed in a medium. The reaction rate of AA 12 hours after the polymerization start point was 97%.

(Manufacturing Examples 2-2 to 2-13 and Comparative Manufacturing Examples 2-1 and 2-2: Manufacturing Polymers R-2 to R-15)

Polymerization reaction solutions containing polymers R-2 to R-15 were obtained by the same operations as in the Manufacturing Example 2-1 except that the charged amounts of the raw materials were as shown in Table 2.

Next, polymers R-2 to R-15 were obtained in powder form from the polymerization solutions by the same operations as in the Manufacturing Example 2-1. Each polymer was stored sealed in a container having vapor barrier properties. In Manufacturing Example 2-11, a polymer Na salt (degree of neutralization 90 mol %) was obtained by using NaOH in place of the LiOH·H₂O powder.

Of the polymers, polymers R-2 to R-7 and R-9 to R-13 are block polymers made up of ABA triblocks, while R-8 is a block polymer made up of AB diblocks, and R-14 and R-15 are non-block polymers.

TABLE 2

| Manufacturing example. Comparative manufacturing example No. | | | ME 2-1 | ME 2-2 | ME 2-3 | ME 2-4 | ME 2-5 | ME 2-6 | ME 2-7 | ME 2-8 |
|---|---|---|---|---|---|---|---|---|---|---|
| | Block Polymer | | R-1 | R-2 | R-3 | R-4 | R-5 | R-6 | R-7 | R-8 |
| Charged [parts] | Polymer block (A) | Polymer A | 1.0 | 2.0 | | | | | | |
| | | Polymer B | | | 1.0 | | | | | |
| | | Polymer C | | | | 1.0 | | | | |
| | | Polymer D | | | | | 1.0 | | | |
| | | Polymer E | | | | | | 1.0 | | |
| | | Polymer F | | | | | | | 1.0 | |
| | | Polymer G | | | | | | | | 1.0 |
| | Polymer block (B) | AA | 100 | 100 | 100 | 100 | 100 | 100 | 100 | 100 |
| | | HEA | | | | | | | | |
| | | St | | | | | | | | |
| | | Crosslinkable monomer T-20 | 0.9 | 0.9 | 0.9 | 0.9 | 0.9 | 0.9 | 0.9 | 0.9 |
| | Basic compound [mol %] | TEA | 1.0 | 1.0 | 1.0 | 1.0 | 1.0 | 1.0 | 1.0 | 1.0 |
| | Polymerization solvent | Deionized water | 2.20 | 2.20 | 2.20 | 2.20 | 2.20 | 2.20 | 2.20 | 2.20 |
| | | Acetonitrile | 567 | 567 | 567 | 567 | 567 | 567 | 567 | 567 |
| | Polymerization initiator | V-65 | 0.040 | 0.040 | 0.040 | 0.040 | 0.040 | 0.040 | 0.040 | 0.040 |
| | Neutralizing agent | LiOH · H$_2$O | 52.4 | 52.4 | 52.4 | 52.4 | 52.4 | 52.4 | 52.4 | 52.4 |
| | | NaOH | | | | | | | | |
| Initial monomer concentration (wt %) | | | 15.0% | 15.0% | 15.0% | 15.0% | 15.0% | 15.0% | 15.0% | 15.0% |
| Neutralized salt | Type | | Li | Li | Li | Li | Li | Li | Li | Li |
| | Degree of neutralization | | 90.0% | 90.0% | 90.0% | 90.0% | 90.0% | 90.0% | 90.0% | 90.0% |
| Reaction rate (%) of monomers of polymer block (B) | | | 97% | 98% | 98% | 98% | 98% | 98% | 97% | 97% |

| Manufacturing example. Comparative manufacturing example No. | | | ME 2-9 | ME 2-10 | ME 2-11 | ME 2-12 | ME 2-13 | Comp. ME 2-1 | Comp. ME 2-2 |
|---|---|---|---|---|---|---|---|---|---|
| | Block Polymer | | R-9 | R-10 | R-11 | R-12 | R-13 | R-14 | R-15 |
| Charged [parts] | Polymer block (A) | Polymer A | 1.0 | 1.0 | 1.0 | 1.0 | 1.0 | | |
| | | Polymer B | | | | | | | |
| | | Polymer C | | | | | | | |
| | | Polymer D | | | | | | | |
| | | Polymer E | | | | | | | |
| | | Polymer F | | | | | | | |
| | | Polymer G | | | | | | | |
| | Polymer block (B) | AA | 100 | 100 | 100 | 80 | 60 | 100 | 99 |
| | | HEA | | | | 20 | 40 | | |
| | | St | | | | | | | 1 |
| | | Crosslinkable monomer T-20 | 0.9 | 0.9 | 0.9 | 0.9 | 0.9 | 0.9 | 0.9 |
| | Basic compound [mol %] | TEA | 1.0 | 1.0 | 1.0 | 1.0 | 1.0 | 1.0 | 1.0 |
| | Polymerization solvent | Deionized water | 2.20 | 2.20 | 2.20 | 2.20 | 2.20 | 2.20 | 2.20 |
| | | Acetonitrile | 567 | 567 | 567 | 567 | 567 | 567 | 567 |
| | Polymerizaion initiator | V-65 | 0.040 | 0.040 | 0.040 | 0.040 | 0.040 | 0.040 | 0.040 |
| | Neutralizing agent | LiOH · H$_2$O | 49.5 | 43.7 | | 41.9 | 31.4 | 52.4 | 51.9 |
| | | NaOH | | | 50.0 | | | | |
| Initial monomer concentration (wt %) | | | 15.0% | 15.0% | 15.0% | 15,0% | 15.0% | 15.0% | 15.0% |
| Neutralized salt | Type | | Li | Li | Na | Li | Li | Li | Li |
| | Degree of neutralization | | 85.0% | 75.0% | 90.0% | 90.0% | 90.0% | 90.0% | 90.0% |
| Reaction rate (%) of monomers of polymer block (B) | | | 97% | 98% | 98% | 97% | 97% | 98% | 98% |

The compounds used in Table 2 are shown in detail below.
AA: Acrylic acid
HEA: 2-hydroxyethyl acrylate
St: Styrene
T-20: Trimethylol propane diallyl ether (Daiso Neoallyl T-20)
TEA: Triethylamine
V-65: 2,2'-azobis (2,4-dimethylvaleronitrile (Fuji Film Wako Pure Chemical)
LiOH·H$_2$O: Lithium hydroxide monohydrate
NaOH: Sodium hydroxide Examples With an electrode mixture layer composition using a block polymer as a binder and the negative active material graphite or graphite and a silicon particle as active materials, the viscosity of the composition (electrode slurry viscosity) and the peeling strength between the formed mixture layer and a collector (that is, the binding ability of the binder) were measured. Natural graphite (Nippon Graphite CGB-10) was used as the graphite and Si Nanopowder (Sigma-Aldrich, particle diameter<100 nm) as the silicon particle.

Example 1

3.2 parts of the block polymer R-1 in powder form were weighed into 100 parts of natural graphite and pre-mixed, 210 parts of deionized water were added, and the mixture was pre-dispersed with a Disper and then dispersed for 15 seconds at a peripheral speed of 20 m/second with a thin-film swivel mixer (Primix FM-56-30) to obtain an electrode mixture layer composition in slurry form (electrode slurry). The solids concentration of the electrode slurry was calculated to be 33.0%.

carboxyl group-containing polymer salts used as binders were as shown in Table 3. In Examples 4 and 5, the natural graphite and silicon particles were stirred for 1 hour at 400 rpm in a planetary ball mill (Fritsch P-5), and 3.2 parts of the block polymer R-3 (Li salt) in powder form were weighed into the resulting mixture and pre-mixed, after which electrode slurries were obtained by the same operations as Example 1. The viscosity of each electrode slurry and the 90° peeling strength (binding ability) of the resulting negative electrode were evaluated with the results shown in Table 3.

TABLE 3

| | | Example 1 | Example 2 | Example 3 | Example 4 | Example 5 | Example 6 | Example 7 | Example 8 | Example 9 |
|---|---|---|---|---|---|---|---|---|---|---|
| Active Material | Graphite | 100 | 100 | 100 | 90 | 80 | 100 | 100 | 100 | 100 |
| | Silicon particle | | | | 10 | 20 | | | | |
| Block polymer | Type | R-1 | R-2 | R-3 | R-4 | R-5 | R-6 | R-7 | R-8 | R-9 |
| | Parts | 3.2 | 3.2 | 3.2 | 3.2 | 3.2 | 3.2 | 3.2 | 3.2 | 3.2 |
| Deionized water | | 210 | 210 | 210 | 210 | 210 | 210 | 210 | 210 | 210 |
| Electrode slurry viscosity (mPa · s) | | 5,000 | 6,500 | 5,500 | 4,800 | 4,900 | 1,700 | 1,500 | 6,000 | 1,800 |
| Peeling strength (N/m) | | 12.8 | 14.4 | 12.8 | 12.0 | 12.4 | 13.2 | 11.2 | 12.0 | 13.6 |

| | | Example 10 | Example 11 | Example 12 | Example 13 | Example 14 | Example 15 | Comp. Ex. 1 | Comp. Ex. 2 |
|---|---|---|---|---|---|---|---|---|---|
| Active Material | Graphite | 100 | 100 | 100 | 100 | 100 | 100 | 100 | 100 |
| | Silicon particle | | | | | | | | |
| Block polymer | Type | R-10 | R-11 | R-12 | R-13 | R-12 | R-13 | R-14 | R-15 |
| | Parts | 3.2 | 3.2 | 3.2 | 3.2 | 3.2 | 3.2 | 3.2 | 3.2 |
| Deionized water | | 210 | 210 | 210 | 210 | 210 | 210 | 210 | 210 |
| Electrode slurry viscosity (mPa · s) | | 4,300 | 7,200 | 12,000 | 3,500 | 900 | 800 | 1,200 | 1,100 |
| Peeling strength (N/m) | | 12.0 | 12.4 | 12.0 | 14.8 | 15.2 | 15.6 | 10.0 | 10.0 |

<Measuring Viscosity of Electrode Slurry>

The slurry viscosity of the electrode slurry obtained above was measured at 25° C. at a shearing speed of 60 s$^{-1}$ with an Anton Paar rheometer (Physica MCR301) on a CP25-5 cone plate (diameter 25 mm, cone angle 5°), and found to be 5,000 mPa·s.

The electrode slurry was coated with a variable applicator onto a 12 micron-thick copper foil (manufactured by Furukawa Electric), and dried in a forced-air drier at 100° C. for 15 minutes to form a mixture layer. This was then rolled to a mixture layer thickness of 50±5 microns and a packing density of 1.60±0.20 g/cm$^3$ to obtain a negative electrode.

<90° Peeling Strength (Binding Ability)>

The negative electrode obtained above was cut into a 25 mm-wide strip, and the mixture layer side of the negative electrode was affixed to a horizontally fixed double-sided tape to prepare a sample for the peeling test. The test sample was dried overnight under reduced pressure at 60° C., 90° peeling (measurement temperature 23° C.) was performed at a tensile speed of 50 mm/minute, and the peeling strength between the mixture layer and the copper foil was measured. The peeling strength was high at 12.8 N/m, a good result.

Examples 2 to 15 and Comparative Examples 1 and 2

Electrode slurries were prepared by the same operations as Example 1 except that the active materials and the In each example, an electrode mixture layer composition using the binder for a secondary battery electrode of the present teaching and an electrode using this electrode mixture were prepared. The peeling strength between the collector and the mixture layer of the electrode obtained from each electrode mixture layer composition (electrode slurry) was high in all cases, and the binding ability was excellent. In comparison with Example 7 in which the Tg of the polymer block (A) was less than −30° C., the peeling strength was higher in the other examples in which the Tg of the polymer block (A) was at least −30° C., showing that this is desirable from the standpoint of binding ability. Furthermore, in comparison with the electrode slurry viscosity (12,000 mPa·s) of the Example 12 in which the block polymer was neutralized to a degree of less than 80 mol %, the slurry viscosity was lower in the other examples in which the block polymer was neutralized to a degree of at least 80 mol %, showing that this is desirable from the standpoint of coating performance and productivity.

In comparison with the examples, the peeling strength was lower in the Comparative Examples 1 and 2 using polymers having no polymer block (A).

INDUSTRIAL APPLICABILITY

The binder for a secondary battery electrode of the present teaching exhibits excellent binding ability in a mixture layer. Therefore, a secondary battery provided with an electrode obtained using this binder is expected to have good durability (cycle characteristics), and application to vehicle mounted secondary batteries is expected. This is also suitable for use with active materials containing silicon and is expected to contribute to higher battery capacities.

The binder for a secondary battery electrode of the present teaching can be applied favorably to nonaqueous electrolyte secondary battery electrodes in particular and is especially useful in nonaqueous electrolyte lithium ion secondary batteries with high energy densities.

The invention claimed is:

1. A binder for a secondary battery electrode, comprising a block polymer having a polymer block (A) and a polymer block (B), wherein
a ratio of the polymer block (A) in the block polymer is 0.1 mass % or more and less than 10 mass %,
a ratio of the polymer block (B) in the block polymer is more than 90 mass % and 99.9 mass % or less
in the polymer block (A), at least one structural unit derived from at least one selected from the group consisting of ethylenically unsaturated carboxylic acid monomers other than (meth) acrylic acid, aromatic vinyl monomers, maleimide compounds, (meth) acrylic acid ester monomers, (meth) acrylamides and their derivatives including N, N'-(oxybisethylene) acrylamide, and nitrile group-containing ethylenically unsaturated monomers constitute 90 mass % or more structural unit of the total structural units of the polymer block (A),
in the polymer block (B), structural units derived from (meth)acrylic acid constitute 60 mass % or more and 100 mass % or less of a total structural units of the polymer block (B) and structural units derived from (meth)acrylic acid hydroxyalkyl ester constitute 0 mass % or more and 40 mass % or less of the total structural units of the polymer block (B), and
wherein the polymer block (A) has a glass transition temperature (Tg) of at least −30° C.

2. The binder for a secondary battery electrode according to claim 1, wherein the polymer block (A) has a glass transition temperature (Tg) of at least −20° C.

3. The binder for a secondary battery electrode according to claim 1, wherein the block polymer is a salt in which at least 80 mol % of carboxyl groups of the block polymer are neutralized.

4. The binder for a secondary battery electrode according to claim 1, wherein the polymer block (B) is a polymer block obtained by polymerizing a monomer composition containing (meth)acrylic acid and a crosslinkable monomer.

5. The binder for a secondary battery electrode according to claim 1, wherein the block polymer is a (ABA) triblock copolymer consisting of the polymer block (A)/polymer block (B)/polymer block (A).

6. The binder for a secondary battery electrode according to claim 1, wherein the ratio of the polymer block (A), is 2 mass % or less, and
a ratio of the polymer block (B) in the block polymer is 98 mass % or more.

7. The binder for a secondary battery electrode according to claim 1, wherein the (meth) acrylic acid ester monomers do not include methyl acrylate, butyl acrylate, hydroxyethyl acrylate, and hydroxypropyl acrylate.

8. The binder for a secondary battery electrode according to claim 1, wherein in the polymer block (B), the structural units derived from acrylic acid constitute 60 mass % or more and 100 mass % or less of the total structural units of the polymer block (B) and the structural units derived from acrylic acid hydroxyalkyl ester constitute 0 mass % or more and 40 mass % or less of the total structural units of the polymer block (B).

9. The binder for a secondary battery electrode according to claim 8, wherein in the polymer block (A), the structural units derived from acrylic acid constitute 60 mass % or more and 100 mass % or less of a total structural units of the polymer block (B) and the structural units derived from acrylic acid hydroxyalkyl ester constitute 0 mass % or more and 40 mass % or less of the total structural units of the polymer block (B).

10. A secondary battery electrode mixture layer composition comprising the binder for a secondary battery electrode according to claim 1 together with an active material and water.

11. A secondary battery electrode provided with an electrode mixture layer containing the binder for a secondary battery electrode according to claim 1 on a surface of a collector.

12. A method for manufacturing a block polymer for use in a binder for a secondary battery electrode, with the block polymer having a polymer block (A) and a polymer block (B),
the method comprises:
polymerizing monomer components with a (meth)acrylic acid content of less than 30 mass % by a living radical polymerization method to manufacture the polymer block (A); and
polymerizing monomer components with a (meth)acrylic acid content of 30 mass % or more and 100 mass % or less in the presence of the polymer block (A) to manufacture the polymer block (B),
wherein a ratio of the polymer block (A) in the block polymer is 0.1 mass % or more and less than 10 mass %, and a ratio of the polymer block (B) in the block polymer is more than 90 mass % and 99.9 mass % or less,
wherein in the polymer block (A), at least one structural unit derived from at least one selected from the group consisting of ethylenically unsaturated carboxylic acid monomers other than (meth) acrylic acid, aromatic vinyl monomers, maleimide compounds, (meth) acrylic acid ester monomers, (meth) acrylamides and their derivatives including N, N'-(oxybisethylene) acrylamide, and nitrile group-containing ethylenically unsaturated monomers constitute 90 mass % or more structural unit of the total structural units of the polymer block (A),
wherein in the polymer block (B), structural units derived from (meth)acrylic acid constitute 60 mass % or more and 100 mass % or less of a total structural units of the polymer block (B) and structural units derived from (meth)acrylic acid hydroxyalkyl ester constitute 0 mass % or more and 40 mass % or less of the total structural units of the polymer block (B), and
wherein the polymer block (A) has a glass transition temperature (Tg) of at least −30° C.

13. The method of manufacturing a block polymer according to claim 12, wherein the living radical polymerization method is a reversible addition-fragmentation chain-transfer polymerization (RAFT) method.

* * * * *